United States Patent [19]
Goss

[11] Patent Number: 5,461,952
[45] Date of Patent: Oct. 31, 1995

[54] BACK-SIDE TAPER WEDGING DRIVE SYSTEM

[75] Inventor: David Goss, Rockford, Ill.

[73] Assignee: Textron Inc., Providence, R.I.

[21] Appl. No.: 130,371

[22] Filed: Oct. 1, 1993

Related U.S. Application Data

[63] Continuation of Ser. No. 883,133, May 14, 1992, Pat. No. 5,291,811.

[51] Int. Cl.$^6$ ................................................. B25B 15/00
[52] U.S. Cl. ................................................ 81/460; 411/404
[58] Field of Search ..................... 81/460, 461; 411/404, 411/403, 919

[56] References Cited

U.S. PATENT DOCUMENTS

| | | |
|---|---|---|
| 2,592,462 | 4/1952 | Phipard . |
| 2,601,453 | 6/1952 | Phipard . |
| 3,028,781 | 4/1962 | Muenchinger . |
| 3,584,667 | 6/1971 | Reiland . |
| 4,228,723 | 10/1980 | Cunningham . |
| 4,269,246 | 5/1981 | Larson et al. . |
| 4,970,922 | 11/1990 | Krivec . |
| 5,019,080 | 5/1991 | Hemer . |

FOREIGN PATENT DOCUMENTS

| | | |
|---|---|---|
| 388215 | 5/1989 | Austria . |
| 742893 | 9/1966 | Canada . |

Primary Examiner—D. S. Meislin
Attorney, Agent, or Firm—Trexler, Bushnell, Giangiorgi & Blackstone, Ltd.

[57] ABSTRACT

A driver assembly for driving fasteners into a workpiece comprises a multilobular fastener engaging portion for engagement in a complementary multilobular socket or recess on a fastener. Each lobe is bounded on opposite sides by a flute, and each lobe includes a driving side wall and a trailing tapered side wall. The driving side walls are adapted to contact the complementary lobular portions of the fastener for applying torque to the fastener, while the trailing tapered side wall is aligned to contact the complementary lobular portion in wedged engagement at a point when the fastener is applied to the fastener portion. A fastener socket is also provided having a driven side wall and a trailing tapered side wall, which is constructed substantially similarly to the tapered side wall of the drive bit and which provides similar attributes.

5 Claims, 3 Drawing Sheets

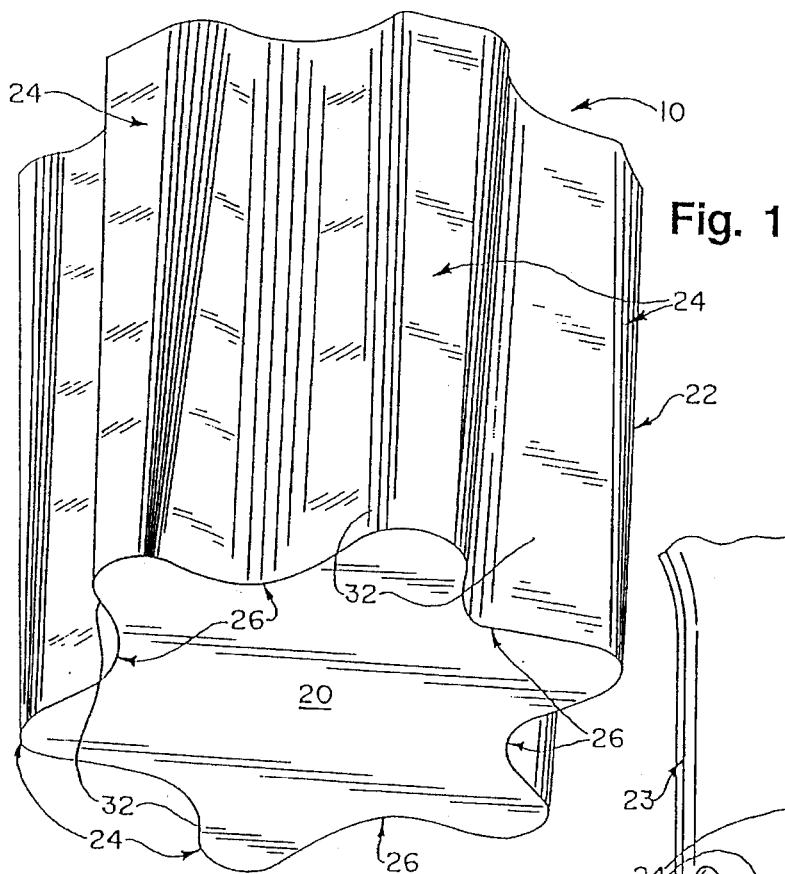
Fig. 1
Fig. 2
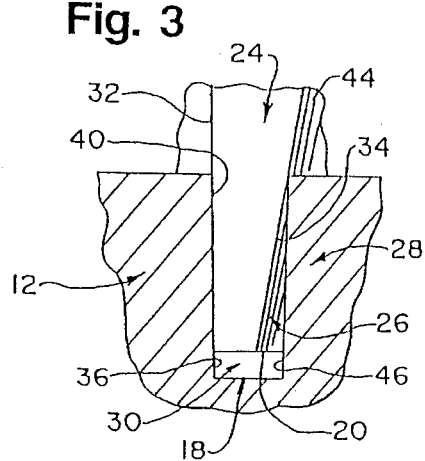
Fig. 3
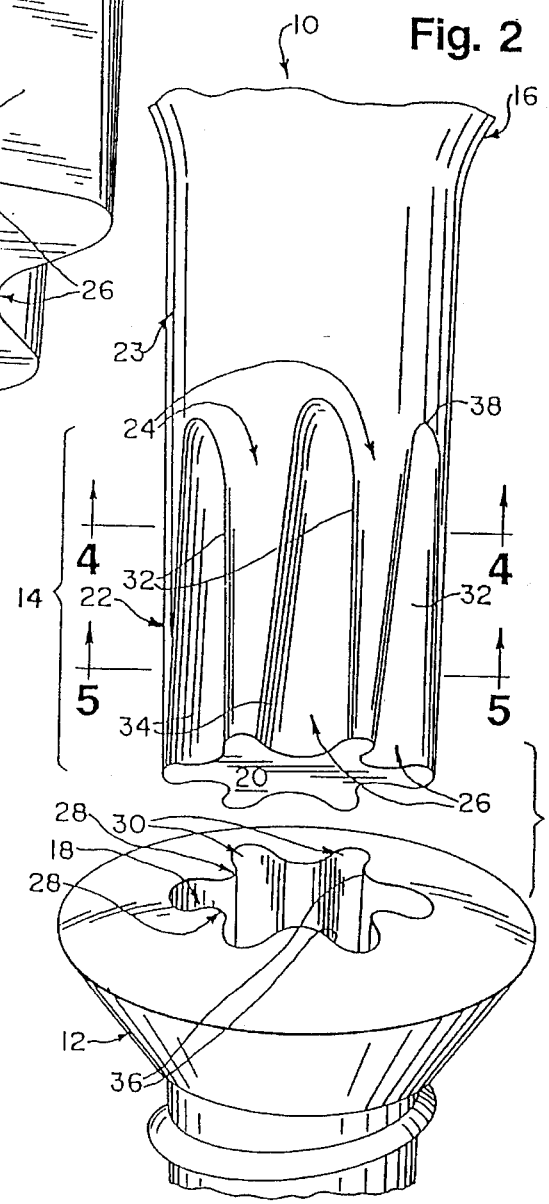

BACK-SIDE TAPER WEDGING DRIVE SYSTEM

This is a continuation of application Ser. No. 07/883,133 filed on May 14, 1992, now U.S. Pat. No. 5,291,811.

BACKGROUND AND SUMMARY OF THE INVENTION

The present invention relates generally to a novelly constructed and configured drive system for driving fasteners into a workpiece, and for attaining wedged engagement between a driver and a fastener such that the fastener will be frictionally retained on the end of the driver. More specifically, the invention as illustrated relates to a novel drive bit and drive socket for use with a TORX® drive system.

Fasteners are a critical component of most structures and mechanisms, from the simplest machine to the highly complex space shuttle. Because of the critical functions performed by these fasteners, improvements in their structure and functional properties are continually sought. One such improvement is the TORX® drive system, which can be employed, for example, in a drive socket or on a head portion of a fastener, or on a drive bit or socket used for driving such a fastener into a workpiece.

The construction and benefits of the TORX® drive system are disclosed in U.S. Pat. No. 3,584,667 to Rieland, assigned to the assignee of the present invention. The disclosure of the '667 patent is incorporated herein by this reference. The TORX® drive represents a significant improvement in the fastener industry.

One such application of the TORX® drive system is disclosed in the patent to Larson et al., U.S. Pat. No. 4,269,246. This patent is also assigned to the assignee of the present invention, and the disclosure thereof is incorporated herein by reference. Specifically, the drive bit of the '246 patent provides means for providing a wedging effect between the bit and a fastener for holding fasteners on the drive bit when the bit is inserted into a recess or socket on the fastener, thereby facilitating one-handed installation of fasteners into a workpiece. This one-handed installation is highly desirable for use in some applications of fasteners where a large number of fasteners are to be installed or inserted into a workpiece, or a plurality of workpieces, such as on an assembly line. This type of frictioned engagement is also desirable where it is preferred to use non-magnetic drives and fasteners. Additionally, the particular construction of the '246 patent helps to prevent "walking" or "wobble" of a fastener, which can cause damage to a workpiece. This "walking" or "wobble" is particularly acute when a pilot hole is not used or during manual installation of self-tapping or self-drilling screws. The drive bit is also self-aligning, which provides significant benefits when utilizing drill screws.

Even though the fastener and the drive bit or assembly provided by the '246 patent are quite effective, there is always room for further improvements and refinements. Specifically, it is to be noted that the drive bit of the '246 patent has a three degree taper on a major diameter thereof. This means that the drive bit makes contact with the fastener at a top of the fastener socket into which the bit is inserted. More definitely, the contact between the bit and the fastener socket occurs at outer, leading edges of lobes on the bit and a center of flutes in the socket. The bit wedges across a major diameter of the bit. Accordingly, the above-discussed wedging effect theoretically occurs at six contact "points," equal in number to the number of flutes and lobes, between the bit and the socket. Because wedging between the bit and the socket occurs only at outside edges of the lobes of the drive bit, high magnitude mechanical stresses can build up at these limited locations. This stress concentration can cause excessive bit wear, as well as loss of dimensional tolerances.

Furthermore, because of the limited contact between the bit and the fastener, a natural tendency arises causing the bit to cam out of the socket in the fastener. Accordingly, there is a potential that the effective lifetime of the drive bit will suffer a reduction, viz. a reduction in ability to prevent wobble, as well as a reduction in the integrity of an interference fit between the bit and the fastener which can make one-handed manual installation more difficult. Additionally, variations in socket fall away, as measured across the major diameter of the socket, which may be difficult to eliminate, can adversely affect depth of penetration of the drive bit into the socket, thereby adding variability of insuring sufficient bit penetration into the socket for driving of the fastener.

A drive system, constructed according to the teachings of the present invention, provides a multilobular drive system which can be embodied in a drive bit, a drive socket, a fastener head post or a fastener socket, which will improve upon the structural and functional characteristics of the drive assembly provided by the above-referenced '246 patent. Specifically, the drive bit of the present invention is configured to wedge in a fastener socket across lobes, between side walls thereof, of the bit. To do this, back-side edges of the lobes of the bit, opposite to the sides thereof which drivingly contact edges of the flutes of the socket, are tapered such that a thickness of the lobes increases from the socket entering end towards the shank of the bit. In this manner, the bit of the invention contacts the socket along the six driving side walls of the bit lobes and the six engaged side walls of the socket flutes, and also contacts the socket at six points proximate the top thereof defined by the engagement between the tapered back-side walls of the bit lobes and the socket flutes, opposite to the engaged side walls thereof. The invention can be employed on a fastener head post in similar fashion.

The multilobular fastener socket of the invention is configured to wedgingly accept a drive bit within flutes, between opposite side walls thereof, of the socket. Specifically, back-side edges of the lobes of the socket, which also define edges of the socket flutes, opposite to the sides thereof which are drivingly contacted by driving edges of the lobes of the drive bit, are tapered such that a width of the socket flutes slopingly decreases, thus causing the thickness of the socket lobes to correspondingly increase, from the socket mouth to the base of the socket. Thus, the socket is contacted by the bit along six driven side walls of the socket flutes, and also at six points proximate the socket base defined by the engagement between the tapered back-side walls of the socket flutes, opposite to the driving side walls thereof, and sides of the bit lobes opposite to the sides thereof in driving engagement with the socket.

It should be noted that engagement at all six lobes, or however many are employed in the multilobular design, is the theoretical maximum. Due to tolerances and wear during use, engagement may occur only at two of three of the drive lobes. Also, while the present invention is illustrated and described with regard to the hexlobular TORX® drive system, it is applicable to other types of multilobular drive systems.

OBJECTS AND SUMMARY OF THE INVENTION

A general object of the present invention is to provide a novelly constructed and configured fastener drive system or assembly.

A more specific object of the invention is to provide a novel drive bit and socket for use with a TORX® shaped drive system.

Another object of the present invention is to provide a novel drive bit which provides a wedging effect or interference fit between the bit and a fastener for maintaining the fastener on the bit prior to driving of the fastener into a workpiece.

An additional object of the invention is to provide a novel drive system which can minimize cam out thereof and wobble or walking of a fastener being driven by the system.

A further object of the present invention is to provide a novel, self-aligning drive system which self-aligns a driver and a fastener applied thereto.

Yet another object of the invention is to provide a novel drive system which minimizes cam out and utilizes end load required to drive a drill screw to minimize wobble or walking thereof.

A further object of the present invention is to provide a novel drive system which maintains a substantially linear driving contact between a driver and a fastener while simultaneously providing a substantially point-like interfering contact therebetween.

An additional object of the invention is to provide a novel drive socket on a fastener which provides a wedging effect or interference fit between the bit and a fastener for maintaining the fastener on the bit prior to driving the fastener into a workpiece.

A drive bit or driver, constructed according to the teachings of the present invention, for driving a fastener into a workpiece comprises a multilobular fastener engaging portion for engagement in a complementary multilobular portion on a fastener. Each lobe is bounded on opposite sides by a flute, and each lobe includes a driving side wall and a trailing tapered side wall. The driving side walls are adapted to contact the complementary multilobular recess or socket of the fastener for applying torque to the fastener, while the trailing tapered side walls are adapted to contact the complementary multilobular recess lobes in wedged engagement at points when the driver is engaged in the fastener recess. A fastener socket is also provided having a driven side wall and a trailing tapered side wall, which is constructed substantially similarly to the tapered side wall of the drive bit and which provides similar attributes.

BRIEF DESCRIPTION OF THE DRAWINGS

The organization and manner of the structure and operation of the invention, together with further objects and advantages thereof, may best be understood by reference to the following description taken in connection with the accompanying drawings, wherein like reference numerals identify like elements in which:

FIG. 1 is a perspective view of a fastener drive bit or driver portion, constructed according to the teachings of the present invention, showing the unique configuration thereof;

FIG. 2 is a partial perspective view of the drive bit of FIG. 1 and an associated fastener;

FIG. 3 is a partial sectional view of a drive bit of the present invention inserted into a complementary socket in a fastener, depicting the linear and wedged contacts between the drive bit and the fastener;

DETAILED DESCRIPTION OF THE PREFERRED EMBODIMENTS

Figure 4:
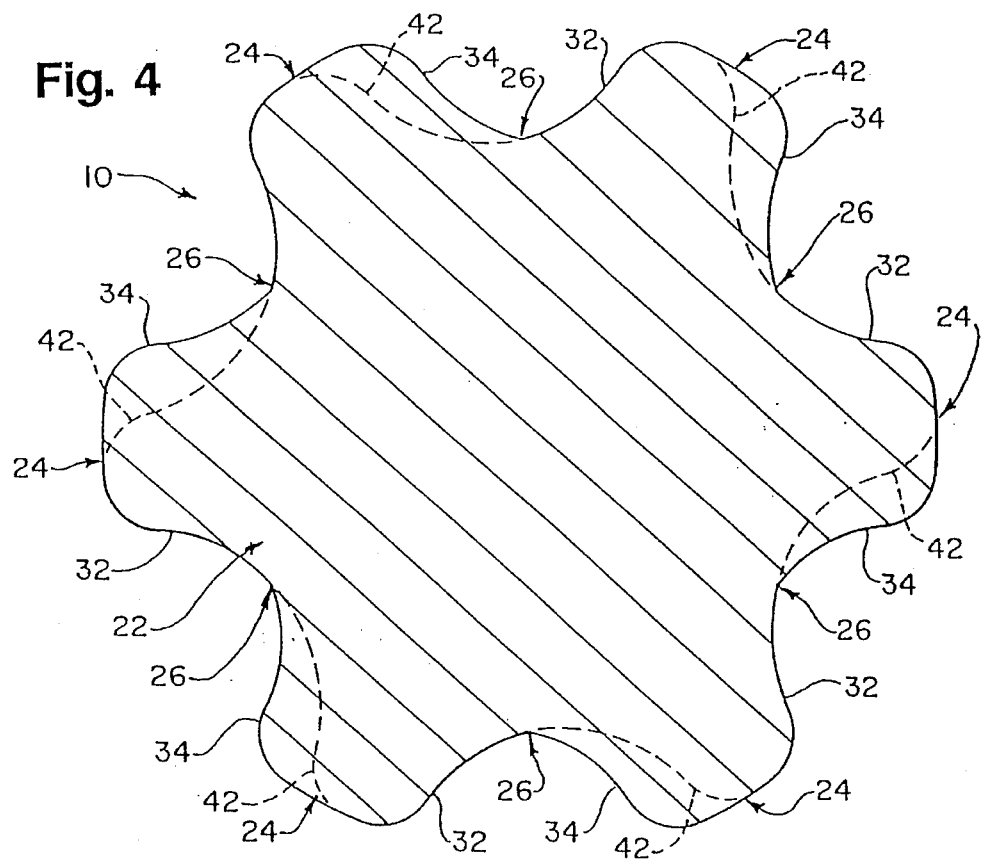
FIG. 4 is a sectional view, taken along line 4—4 of FIG. 2, comparing the flared cross sectional configuration of the bit at that location to a standard TORX® cross sectional configuration illustrated in broken line.

While the invention may be susceptible to embodiment in different forms, there is shown in the drawings, and herein will be described in detail, specific embodiments with the understanding that the present disclosure is to be considered an exemplification of the principles of the invention, and is not intended to limit the invention to that as illustrated and described herein.

Referring initially to FIGS. 1 and 2, a back-side taper wedging drive bit 10, constructed according to the teachings of the present invention, is illustrated. The drive bit 10 can be constructed from any suitable material having sufficient structural integrity for applying necessary torque to a fastener 12, shown partially in FIG. 2, for driving said fastener 12 into a workpiece, not shown. The unique construction and configuration of the bit 10 allows it to provide the above-discussed advantages, as will be discussed in further detail hereinbelow.

As shown in FIGS. 1 and 2, the bit 10 is substantially cylindrical in configuration having a fastener engaging portion 14 and a tool shank portion 16. The fastener engaging portion 14 is constructed for insertion into a recess or socket 18, shown partially in FIGS. 2 and 3, in the fastener 12. The fastener engaging portion 14 has a diameter somewhat smaller than a corresponding diameter of the tool shank portion 16 for facilitating efficient torque transfer from the tool shank portion 16 to the fastener engaging portion 14. The tool shank portion 16, shown partially in FIG. 2, is constructed for accepting an appropriate tool, not shown, such as a wrench, drill or the like, for applying a torque to the bit 10, and thereby to a fastener 12.

The fastener engaging portion 14 is uniquely constructed for providing the above-discussed benefits. Specifically, the fastener engaging portion 14 comprises an entering end 20, a socket engaging portion 22 extending from the end 20, and a shank portion 23 connecting the portion 22 to the tool shank portion 16. The entering end 20 is configured for entering the socket 18 in the fastener 12 to a certain depth for facilitating torque transfer from the bit 10 to the fastener 12, as well as for facilitating alignment of the fastener 12 with the bit 10 and formation of an interference fit between the bit 10 and the fastener 12 for frictionally mounting the fastener 12 on the end of the bit 10 which facilitates one-handed installation. The entering end 20 is preferably substantially planar.

The unique configuration of the socket engaging portion 22 embodies the invention. The engaging portion 22 has a multilobular configuration which, as shown, is in accordance with the TORX® drive system disclosed in the above-referenced patent to Rieland. Specifically, the portion 22 comprises a plurality of lobes 24 and flutes 26, each preferably being six in number. The lobes 24 and flutes 26 are spaced equidistantly along the circumference of the portion 22 with adjacent lobes 24 being separated by a flute 26. The orientation of the lobes 24 and flutes 26 is intended to operatively mate with complementary lobes 28 and flutes 30 forming the socket 18 in the fastener 12. The lobes 28 and flutes 30 are constructed and configured in accordance with the above-referenced Rieland patent. The multilobular configurations of the socket 18 and the engaging portion 22 provide an inherently stable drive system which, due to the fact that the walls of the lobes and the flutes are disposed generally parallel to the axis of the bit 10, resists cam out of the bit 10 to a certain degree. The lobes 24 define boundaries of the flutes 26. Accordingly, the hereinbelow-disclosed structure of the lobes 24 also corresponds to the complementary structure of the flutes 26. The same reasoning applies to the lobes 28 and the flutes 30 comprising the socket 18.

In the preferred embodiment illustrated, each of the lobes 24 comprises a driving side wall 32 which is parallel to the axis of the bit 10 and an opposite tapered back-side wall 34 extending from the entering end 20 to a demarcation, indicated by reference character 38, between the socket engaging portion 22 and the shank portion 23. However, it is to be noted that the invention functions as described herein even if only one lobe 24 has a driving side wall 32 and a trailing tapered side wall 34. The driving side walls 32 are oriented so that the driving side walls 32 facilitate driving of the fastener 12 into a workpiece, viz. a bit for driving right-handed screws would have rightwardly facing driving side walls 32. The driving side walls 32 contact driven side walls 36 of the flutes 30, as shown in FIG. 3, when the entering end 20 is properly inserted into the socket 18. A linear line of contact, indicated by reference character 40, is thusly formed between the lobes 24 of bit 10 and the fastener 12 at each lobe-flute interface defining the driving engagement between the bit 10 and the fastener 12. It is to be noted that the line of contact on the driving side walls 32 remains parallel to the contact line on the driven side walls 36. In this manner, the bit 10 is able to transfer sufficient torque along the contact line to the fastener 12 to drive the same into a workpiece.

The tapered trailing side wall 34 of one lobe 24 opposes the driving side wall 32 of an adjacent lobe 24. However, whereas the driving side walls 32 are substantially parallel with respect to the axis of the entering end 20, the tapered trailing side walls 34 define an angle with respect to an associated driving side wall 32 measuring, in the preferred construction, approximately seven degrees (7°) which opens upwardly towards the demarcation 38. Accordingly, the thickness of the lobes 24 continuously gradually increases as the lobes 24 extend upwardly from the entering end 20. More importantly, the angularly tapered configuration of the walls 34 causes the configuration of the socket engaging portion 22 to depart somewhat from the general, standard TORX® configuration, as disclosed in the above-referenced '667 patent, progressing from the entering end 20 upwardly towards the demarcation 38.

Figure 5:
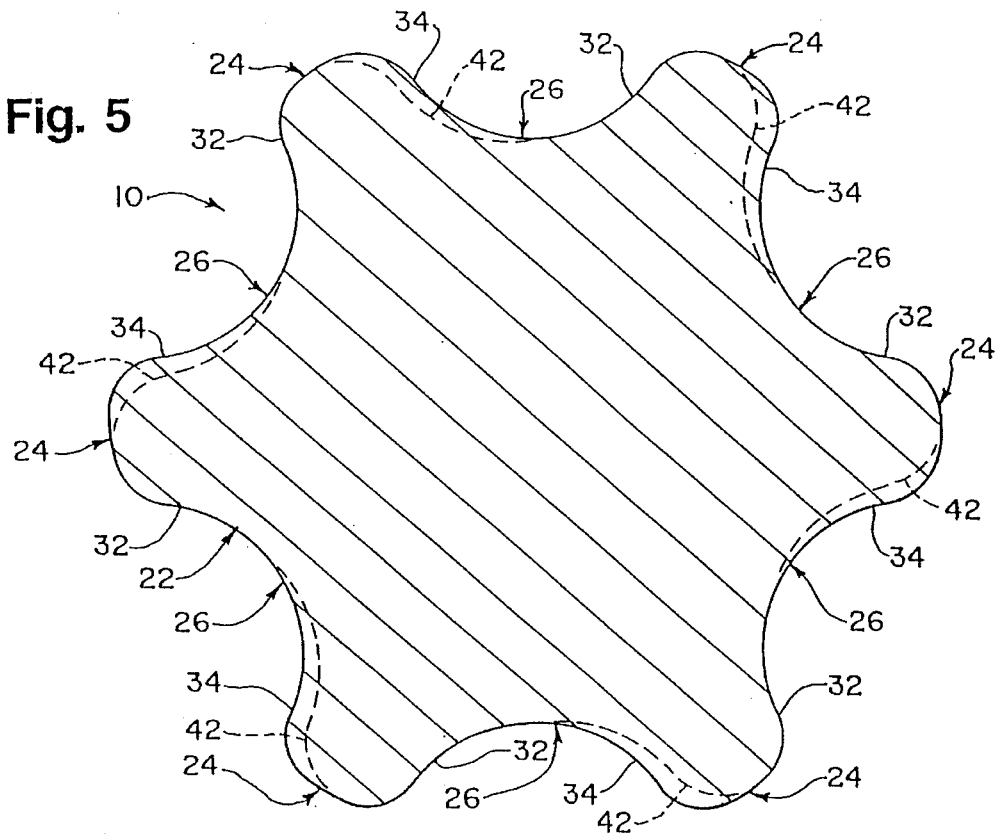
FIG. 5 is a sectional view, taken along line 5—5 of FIG. 2, making the same comparison as FIG. 4, at a location offset downwardly from the location of FIG. 4.

Specifically, it is to be noted that the multilobular configuration of the portion 22 conforms almost exactly to the TORX® drive system configuration, illustrated in cross section in dotted lines 42 in FIGS. 4 and 5, at a location proximate to the entering end 20. However, as the tapered trailing side walls 34 extend angularly upwardly towards the demarcation 38, the TORX® cross section is distorted. This distortion is clearly illustrated in FIGS. 4 and 5 by comparing the TORX® drive system configuration of dotted lines 42 with the actual cross sections shown in full lines. As the tapered walls 34 extend upwardly from the entering end 20 towards the demarcation 38, the distortion increases as the tapered wall 34 of a certain lobe 24 moves farther and farther away, along the circumference of the portion 22, from the driving wall 32 associated with the same lobe 24.

The thickness of the lobes 24 also correspondingly increases. The thickness of the lobes 24 increases to a point where the thickness of the lobes 24 equals the width of a flute 30 in the socket 18, as shown in FIG. 3. When the thickness of the lobes 24 has increased to this magnitude, the engaging portion 22 forms a wedged contact, which may be point contact, indicated by reference character 44, between the bit 10 and the fastener 12 when the bit 10 is inserted into the socket 18. Specifically, the tapered trailing side walls 34 engage side walls 46 of the flutes 30 in the socket 18 at individual points 44, only one being shown in FIG. 3, associated with each of the flutes 30 and located at the top of the socket 18, as illustrated in FIG. 3. This forms a wedging or interference fit between the fastener 12 and the bit 10, thereby maintaining the fastener 12 on the bit 10 and facilitating one-handed installation.

It is important to note that the wedging or interference occurs across individual lobes 24 between the driving side walls 32 and the tapered walls 34, as opposed to occurring across a major diameter (i.e. across diametrically opposed lobes) of the bit, as provided by the '246 patent discussed in detail hereinabove. The interference fit facilitates one-handed installation. Because there are six lobes 24 and 28 and six flutes 26 and 30 on the bit 10 and the fastener 12, respectively, six contact lines 40 are formed as well as six points of contact 44. This contact configuration provides the bit 10 with the unique attributes of the invention discussed hereinbefore.

Because the walls 34 taper upwardly from the entering end 20, it is assured that the socket entering portion 22 will be appropriately inserted into the socket 18 a depth sufficient to insure proper and desired torque transfer from the bit 10 to the fastener 12. This depth of penetration or insertion is sufficient to allow the bit 10 to reduce any tendency, which is already minimal due to the general overall TORX® configuration of the bit 10 and the fastener 12, of the portion 22 to cam out of the socket 18 when the fastener 12 is driven into a workpiece by the bit 10. The tapered trailing side walls 34 also cause the fastener 12 to self-align with the bit 10 during installation.

Because of the cam out resistance provided by the TORX® drive system configuration, an end load is not required to insert a fastener 12 into a workpiece with the bit 10. However, when self-tapping or drill screws are used, often no pilot hole is provided. Accordingly, when self-tapping screws are utilized, an end load is required for facilitating tapping or drilling of the screw into the workpiece. With the particular contact line-point of contact configuration provided by the bit 10, the bit 10 is able to utilize this requisite end load to minimize wobble or walking of self-tapping screws as they are driven into a workpiece. Thus, the tapered walls 34 of the bit 10 are able to perform not only as means for preventing cam out and means for aligning the fastener 12 with the bit 10, but also as means for reducing wobble.

Figure 6:
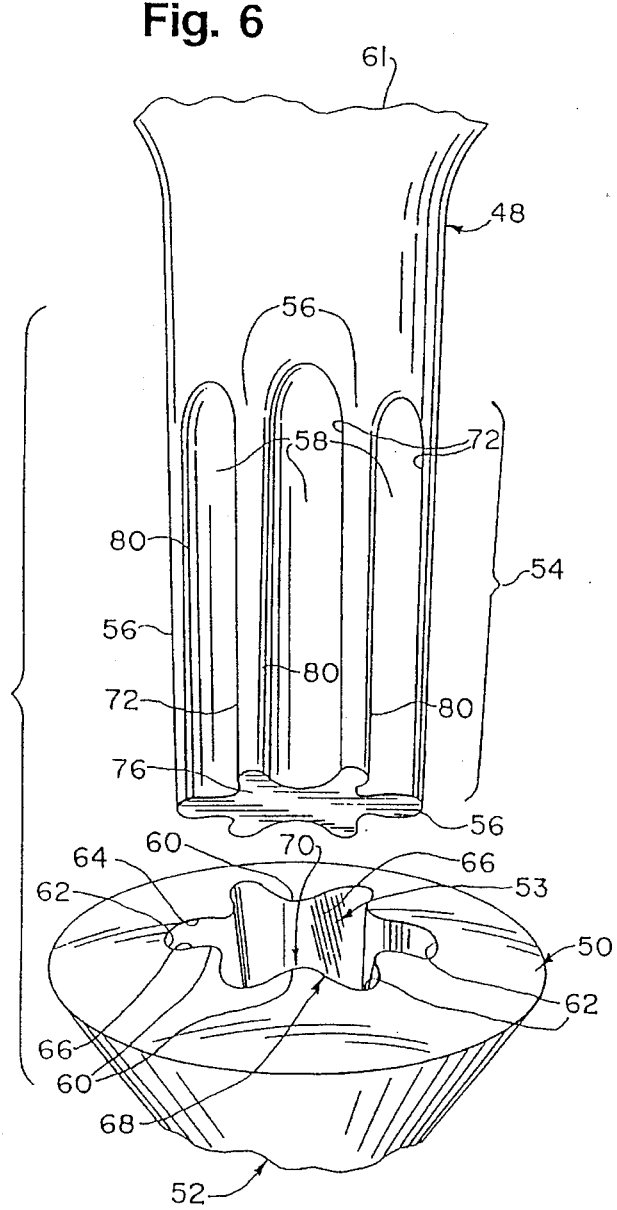
FIG. 6 is a partial perspective view, similar to that of FIG. 2, of another embodiment of the invention, viz. a novel socket configuration for a fastener.
Figure 7:
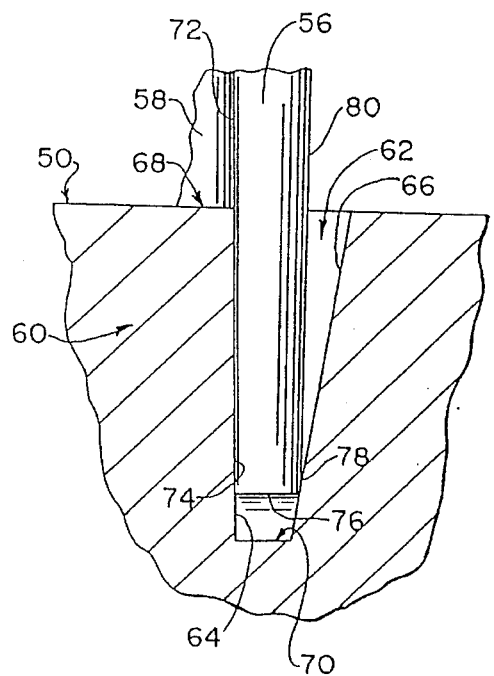
FIG. 7 is a partial sectional view of a TORX® drive bit inserted into a fastener socket constructed according to the teachings of the present invention, illustrating the linear and wedged contacts between the drive bit and the fastener.

As noted hereinabove, the benefits inherent in the invention can be provided by including a back-side taper on appropriate sides of either driver lobes or fastener lobes. One embodiment of the latter application of the invention is illustrated in FIGS. 6 and 7, viz. a novelly constructed fastener socket 53. It is to be noted, however, that, although this embodiment is illustrated with respect to a fastener 52, the invention can be equally well employed with lobes on a drive socket, just as, in similar fashion, the first-discussed embodiment can be employed with lobes on a fastener head which are engaged by a drive socket.

FIG. 6 partially shows a TORX® drive bit 48 and a head portion 50 of a fastener 52 having a bit-accepting socket 53, constructed according to the teachings of the present invention. The drive bit 48 has a fastener entering portion 54, comprising a plurality of alternating lobes 56 and flutes 58, and a tool portion 61, attachable to an appropriate tool or other source of torque for driving the fastener 52 into a workpiece, not shown, on opposite ends of the bit 48. The lobes 56 and flutes 58 of the bit 48 define a TORX® configuration, described in the above-referenced patent to Rieland, and also define a latitudinal cross section substantially similar to the cross section illustrated by the dotted lines 42 of FIGS. 4 and 5. It is to be noted that the cross section of the entering portion 54 remains constant along the length thereof, i.e. the back-side walls of the bit lobes 56 are not tapered.

The socket 53 comprises a plurality of alternating lobes 60 and flutes 62, each preferably being six in number, substantially similar to the lobes 24 and flutes 26 of the drive bit 10 discussed hereinabove. The lobes 60 and flutes 62 are spaced equidistantly along the circumference of the socket 53 with adjacent lobes 60 being separated by a flute 62, with the orientation of the flutes 60 and lobes 62 being complementary to the orientation of the lobes 56 and the flutes 58 for facilitating insertion of the bit 48 into the socket 53. When the bit 48 is inserted into the socket 53, an inherently stable drive system is formed, with the bit 48 being able to sufficiently resist camming out of the socket 53.

As shown in FIG. 6, each of the lobes 60 comprises a driven side wall 64 and an opposite tapered back-side wall 66 extending from a mouth 68 of the socket 53 to a base 70 of the socket 53, as is visible in FIG. 7. It is to be noted that the invention functions as described herein even if only one lobe 60 has a driven side wall 64 and a tapered back-side wall 66. The walls 64 and 66 are oriented for facilitating torque transfer from the bit 48 to the fastener 52. Specifically, when the bit 48 is properly inserted into the socket 53, as is partially shown in FIG. 7, driving side walls 72 of the bit 48 drivingly engage the driven side walls 64, thusly forming a linear line of contact, indicated by reference character 74, at each interface between the lobes 56 and the lobes 60 defining the driving engagement between the bit 48 and the fastener 52. This line of contact 74 on the driven side walls 64 remains parallel to the line of contact on the driving side walls 72 for insuring sufficient torque transfer from the bit 48 along the contact line 74 to the fastener 52.

The tapered back-side wall 66 of one lobe 60 opposes the driven side wall 64 of an adjacent lobe 60, but the back-side walls 64 define an angle with respect to an opposing driven side wall 64 preferably measuring approximately seven degrees (7°), opening upwardly from the base 70 towards the mouth 68. Because of the angularly sloping nature of the walls 64, and thus the lobes 60, the thickness of the lobes 60 continuously gradually decreases as the lobes 60 extend upwardly from the base 70 to the mouth 68. Correspondingly, this means that the width of the flutes 58 gradually increases as the flutes 58 extend from the base 70 to the mouth 68. Therefore, while the latitudinal cross section of the socket 53 closely resembles the TORX® configuration, as shown by the dotted lines 42 of FIGS. 3 and 4, at a location offset slightly upwardly from the base 70, this cross sectional configuration deviates from the TORX® configuration as the cross section is moved up or down along the socket 53. The distortion of this cross sectional configuration of the socket 53 increases as the wall 66 tapers away from the base 70.

As the walls 66 taper from the mouth 68 towards the base 70, the width of the bit lobe-accepting flutes 62 decreases until the width of the flutes 62 equals the thickness of a drive bit lobe 56, as shown in FIG. 7. This occurs at a location on the socket 53 offset upwardly from the base 70 such that an entering end 76 of the portion 54 of the bit 48 cannot contact the base 70 when inserted into the socket 53. At this point, indicated by the reference numeral 78, the walls 66 form a wedged contact, which may be a point contact, with trailing side walls 80 of the lobes 56, between the bit 48 and the fastener 52, when the bit 48 is inserted into the socket 53.

The walls 66 engage the walls 80 at individual points 78, one of which being visible in FIG. 7, associated with each of the lobes 56 and located proximate the base 70 of the socket 53. This forms substantially the same wedging or interference fit between the bit 48 and the fastener 52 as is discussed hereinabove with respect to the bit 10 and the fastener 12, providing the socket 53, and thereby the fastener 52 with all of the unique attributes of the invention discussed herein. Therefore, it is evident that the teachings of the present invention can be effectively utilized with a drive bit, a drive socket, a drive post on a fastener, or a drive socket on a fastener, for example, without departing from the scope of the invention.

The back-side taper wedging drive system of the present invention represent a significant improvement in fastener driving systems. The back-side taper drive bits of the invention are approximately eighteen percent stronger than the bits of the prior art with respect to ultimate failure torque in a socket. Additionally, the invention provides approximately a ten percent higher socket drive efficiency when compared to the prior art bits. Furthermore, the back-side taper bits have a reduced tendency as compared to the prior art bits for failure with regards to effectiveness of an interference fit between the bit and a fastener, as well as wobble or walking. Other utilizations of the teachings of the invention should provide similar beneficial characteristics.

While preferred embodiments of the present invention are shown and described, it is envisioned that those skilled in the art may devise various modifications of the present invention without departing from the spirit and scope of the appended claims. The invention is not intended to be limited by the foregoing disclosure, but only by the following appended claims.

The invention claimed is:

1. A drive system for driving fasteners into a workpiece comprising: a multilobular driving portion for engagement with a complementary multilobular driven portion; the driving portion and the driven portion each including alternating flutes and lobes and a central axis extending longitudinally therethrough; each lobe having a drive wall and a trailing wall; each of said lobes abutting a flute; each of said drive walls having a planar face portion disposed generally parallel to said central axis for facilitating torque transfer from the driving portion to the driven portion and said trailing walls; and at least one of said trailing walls being tapered relative to the corresponding driving wall contacting an abutting lobe in wedging engagement when the driving portion is engaged with the driven portion.

2. A drive system as defined in claim 1 wherein said at least one trailing wall defines an approximately seven degree taper with respect to the drive wall.

3. A drive system as defined in claim 1 wherein a lobe defined by a drive wall and a trailing wall has a thickness dimension increasing responsive to tapering of the trailing wall; and an interference fit being formed across the thickness dimension between the driven portion and the driving portion when the driving portion is engaged with the driven portion.

4. An engaging drive component for use in a rotary drive system of the type having a drive device and an article which is engageable with said drive device by way of said engaging drive component, said drive device providing rotary motion and transferring such rotary motion to said article through said engaging drive component thereby rotating said article; a central axis extending generally coincidentally through said engaging drive component and a rotational drive direction being defined by a plane generally perpendicular to said central axis; said engaging drive component comprising:

a female member having an arrangement of flutes and lobes defining a recess;

a male member having an arrangement of flutes and lobes engageable with corresponding lobes and flutes, respectively, of said female member;

a first side and a second side on each of said lobes in said arrangement of lobes in said female and said male members;

one of said female and male members carrying a first drive wall on said first side of each of said lobes and a first trailing wall disposed on said second side of said lobes carrying said drive walls, said first drive walls being generally parallel to said central axis and said first trailing wall being positioned at an angle relative to said first drive wall defining a thickness dimension measured through said lobe between said first drive wall and said first trailing wall, said thickness dimension decreasing axially along said lobe;

the other of said female and male member having a second drive wall and a second trailing wall disposed on opposite sides of said lobes, both of said second drive wall and said second trailing wall being generally parallel to said central axis;

a planar area of said first drive wall and a planar portion of said second drive wall being placed in face-to-face contact upon engaging said female and male members of said engaging drive component; and said first trailing wall producing a wedging engagement with said second trailing wall upon engaging said female and male members of said engaging drive component.

5. An engaging drive component as recited in claim 4 wherein said first trailing wall defines an approximately seven degree taper relative to said first drive wall.

* * * * *

UNITED STATES PATENT AND TRADEMARK OFFICE
CERTIFICATE OF CORRECTION

PATENT NO. : 5,461,952
DATED : October 31, 1995
INVENTOR(S) : David Goss

It is certified that error appears in the above-indentified patent and that said Letters Patent is hereby corrected as shown below:

Column 4, Line 40 Please add the following paragraph as it was amended in our response of June 15, 1994.

— It is to be noted that, while the present invention will be discussed with respect to the employment thereof with a <u>male member</u> drive bit 10, the present invention can be equally beneficially applied in a <u>female member</u> drive socket, a <u>male</u> member fastener head, a <u>female member</u> fastener socket, as shown in Figs. 6 and 7 or other form of torque transfer device <u>or drive component for use in a rotary drive system.</u> —

Signed and Sealed this

Thirtieth Day of April, 1996

Attest:

BRUCE LEHMAN

*Attesting Officer*  *Commissioner of Patents and Trademarks*